United States Patent [19]
Woolley

[11] 3,927,921
[45] Dec. 23, 1975

[54] LUBRICATED AXIAL THRUST BEARING

[75] Inventor: Ronald William Woolley, Poole, England

[73] Assignee: British Gas Corporation, London, England

[22] Filed: May 31, 1974

[21] Appl. No.: 475,310

[30] Foreign Application Priority Data
June 4, 1973 United Kingdom............. 26472/73

[52] U.S. Cl. .................. 308/134.1; 308/9; 308/72; 308/172
[51] Int. Cl.² ................ F16C 1/24; F16C 17/08; F16C 23/04; F16C 35/10
[58] Field of Search ........ 308/9, 72, 78, 134.1, 172

[56] References Cited
UNITED STATES PATENTS

| | | | |
|---|---|---|---|
| 2,221,725 | 11/1940 | Shipman | 308/134.1 |
| 2,722,463 | 11/1955 | Shaw et al. | 308/9 |
| 3,154,353 | 10/1964 | Haringx et al. | 308/172 X |
| 3,265,452 | 8/1966 | Pan et al. | 308/172 X |

Primary Examiner—M. Henson Wood, Jr.
Assistant Examiner—Howard Beltran
Attorney, Agent, or Firm—Larson, Taylor & Hinds

[57] ABSTRACT

An improved recirculatory lubricated bearing comprising a rotary member in which lubricant is housed around a bearing cup fixed in the housing, hemispherical stationary bearing member having pumping grooves on it surface and adapted to fit in the cup whereby in use to cause a recirculatory flow of lubricant around the bearing surfaces, and a stub axle extending from the stationary bearing and projecting through an opening in the housing.

8 Claims, 2 Drawing Figures

LUBRICATED AXIAL THRUST BEARING

This invention relates to lubricated bearings capable of supporting both radial and axial loads.

According to the invention, such a bearing comprises a rotary member which includes a housing with an opening at one end and a bearing cup fixed in the housing with its mouth directed towards said opening and with a lubricant space in the housing surrounding the cup and extending on both sides of a plane defined by the rim of the bearing cup, a stationary member having a bearing part adapted to fit in the bearing cup for rotatably supporting the rotary member and a part extending from the bearing part arranged to project from the housing through its opening, and means for preventing the discharge of lubricant from the opening of the housing as the housing rotates.

Either the rotary member or the stationary member can be provided with grooves in its bearing surface adapted to produce a viscous pumping action on the lubricant in the bearing when the rotary member rotates to cause the lubricant, which may be grease or oil, to flow from the lubricant space to between the rotary and stationary bearing faces. Thus, the bearing surfaces are always separated by a moving film of lubricant whilst the bearing is in operation, although they will be axially biased towards each other, for example, by spring or gravitational loading of one bearing member with respect to the other, in order to ensure satisfactory pumping action on the lubricant.

Preferably, the pumping grooves are provided on the external surface of the bearing part of the stationary member, and the cup has an aperture formed through its centre.

In use of the bearing, the lubricant space within the housing is filled with lubricant to a level beyond the mouth of the cup so that during rotation of the housing the lubricant assumes a vortex within the housing causing it to adopt a tube-like shape as it is forced centrifugally outwards against a peripheral wall of the housing.

The amount of lubricant placed in the housing will be such as to ensure that it extends over the rim of the cup when the housing is rotating at its maximum speed and in consequence held by centrifugal force in said tube-like shape so that the lubricant can be drawn by the viscous pumping action of the pumping grooves between the cup and bearing surface of the stationary bearing member and then discharged through the central aperture in the cup whence it is caused to recirculate into the mass of lubricant in the housing.

The lubricant will be forced towards the opening of the housing as the speed of rotation of the housing increases, but it is prevented from escaping from the opening of the housing by the discharge preventing means, which could conveniently take the form of an oil seal fixed to the stationary bearing member, although preferably it is in the form of a cover fixed to, so as to rotate with, the housing, said opening of the housing then being formed at the centre of the cover.

The projecting part, which may take the form of a stub axle of the stationary member extends with a small clearance through the opening in the cover. Since the lubricant adopts a tube-like shape and is forced against the peripheral wall of the housing, it is held by the centrifugal force away from the central opening in the cover and this prevents escape of the lubricant.

Thus, with this arrangement the housing may hold a substantial volume of lubricant and this is continuously recirculated between the bearing surfaces whenever the bearing is in operation. Any gases, for example, air, which may become entrapped in the lubricant are separated from the lubricant because, its density being lower than that of the lubricant causes the gas to remain in the centre of the tube-like mass of lubricant. The gases will not, therefore, enter the lubricant film which flows between the bearing surfaces and any reduction in the load carrying capacity of the lubricant film is thus prevented. Owing to the relatively large mass of lubricant which may be contained within the housing and the maintenance of the lubricant film in the bearing, the bearing may operate for very long periods of time without maintenance. Furthermore, owing to the efficiency of the lubrication, the bearing will run extremely quietly. These advantages make the bearing particularly suitable for use with electric motor-driven air blowers and other machines which are required to operate with a minimum of noise.

The internal surface of the cup and the bearing surface of the stationary bearing member are preferably of hemispherical shape, but they may, for example, as an alternative be conical or frustoconical.

Where, for example, the lubricant is grease, it will maintain its tube-like shape which has been impressed upon it when rotation ceases. This is due to the property of grease which requires that a stress of above a certain magnitude must be applied to it before it will move out of the position which it has adopted. The stress required to produce movement is greater than that imposed upon it by its own weight.

Such a grease filled bearing may be operated with the axis of rotation of its housing lying in any direction. If oil were the lubricant used, it would of course run out of the opening in the cover as soon as rotation ceased where the axis of rotation was above the horizontal. However, an oil filled bearing can be used in an inverted position if a rotary seal is provided between the housing and the stationary bearing member.

Normally, the bearing surfaces could be in contact with each other at the commencement of rotation and before flow of lubricant therebetween, and to reduce wear of the surfaces under this condition, one or both bearing surfaces may be coated with a low friction boundary lubricant, for example, P.T.F.E.

One embodiment of the invention will now be described by way of example with reference to the accompanying drawing in which.

Figure 1:
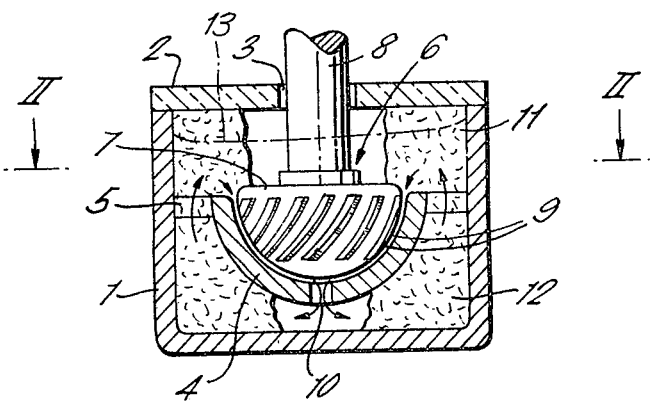
FIG. 1 is a diagrammatic central sectional elevation of the bearing.
Figure 2:
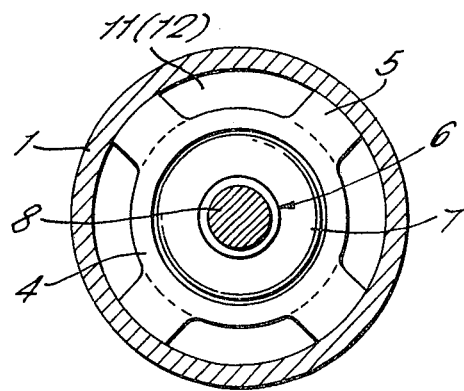
FIG. 2 is a diagrammatic sectional plan on the line II-II of FIG. 1.

Referring to the drawing, the recirculating lubricated bearing comprises a rotary housing 1 having a detachable cover plate 2 which is provided with an opening 3 and a bearing cup 4 fixed by its slotted rim flange 5 to the cylindrical wall of the housing 1. A stationary bearing member 6 having a hemispherical part 7 is adapted to fit under suitable axial loading in the cup 4 with a concentric working clearance of about 0.003 inch in use. The shaft 8 of the stationary bearing 6 extends from the hemispherical part 7 and projects through the opening 3 in the cover plate 2 leaving a small clearance therebetween.

The surface of the bearing 7 is formed with a plurality of inclined grooves 9 providing the means for producing the viscous pumping action to the lubricant in use. An aperture 10 is formed centrally in the cup 4. A lubricant, for example grease, is packed into the spaces 11 and 12 in the housing 1 surrounding the cup 4 both above and below its rim flange 5, e.g., to a general level indicated by the chain dotted line 13 shown in FIG. 1.

In use of the bearing at working rotational speeds, the grease will assume the tube-like shape in the housing, as shown in FIG. 1, and the viscous pumping action will cause circulatory flow of lubricant between the bearing surfaces and the spaces 11 and 12 via the slots in the flange 5 and central aperture 10 as indicated by arrows.

I claim:

1. A recirculatory lubricated bearing comprising a rotary member which includes a housing with an opening at one end and a bearing cup fixed in the housing with its mouth directed toward the said opening and with a lubricant space in the housing surrounding the cup and extending on both sides of a plane defined by the rim of the bearing cup, said cup having an aperture centrally located in the cup bottom, a stationary member having a bearing part fitting in the bearing cup for rotatably supporting the rotary member and a part extending from the bearing part and projecting from the housing through its opening, means for preventing the discharge of lubricant from the opening of the housing as the housing rotates, the rotary and stationary bearing members being axially biased toward positions of mutual engagement of their bearing surfaces defined by the interior surface of said bearing cup and the external surface of said stationary bearing part, at least one of the bearing surfaces being provided with grooves for producing a viscous pumping action on the lubricant in use of the bearing, the lubricant space within the housing being filled with lubricant to a level beyond the mouth of the cup such that during rotation of the housing the lubricant assumes a vortex within the housing causing it to adopt a tube-like shape as it is forced centrifugally outwardly against the peripheral wall of the housing, but such that it can be drawn via the viscous pumping action of the pumping grooves between the bearing surface of the cup and the bearing surface of the stationary bearing member and then discharged through the central aperture in the cup whence it is caused to recirculate into the mass of lubricant in the housing.

2. A bearing according to claim 1 wherein the lubricant discharge preventing means is in the form of a cover fixed to the housing and in which cover the said opening of the housing is formed at its centre.

3. A bearing according to claim 1 wherein the projecting part of the stationary member is a stub axle which extends through the said opening with a small clearance therebetween.

4. A bearing according to claim 1 wherein the bearing surface of the stationary bearing member is of hemi-spherical shape.

5. A bearing according to claim 1 wherein the lubricant is a grease which will enable the bearing to be operated with the axis of the rotation lying in any direction.

6. A bearing according to claim 5 wherein at least one bearing surface is coated with a low-friction boundary lubricant.

7. A bearing according to claim 6, wherein the lubricant discharge preventing means is in the form of a cover fixed to the housing and in which cover the opening of the housing is formed at its centre, and wherein the projecting part of the stationary member is a stub axle arranged to extend through the opening in the cover with a small clearance therebetween, the bearing surface of the stationary member being of hemi-spherical shape.

8. A bearing according to claim 1 wherein the pumping grooves are provided on the external surface of said stationary bearing part.

* * * * *